A. BARNUM & J. A. WISHART.
STOVE-PIPE DAMPER.

No. 175,642. Patented April 4, 1876.

WITNESSES
Franck L. Ourand
C. L. Evert

INVENTOR
A. Barnum
J. A. Wishart
By T. H. Alexander
Attorneys

UNITED STATES PATENT OFFICE.

ASHBELL BARNUM AND JAMES A. WISHART, OF GREEN ISLAND, N. Y.

IMPROVEMENT IN STOVE-PIPE DAMPERS.

Specification forming part of Letters Patent No. 175,642, dated April 4, 1876; application filed March 11, 1876.

*To all whom it may concern:*

Be it known that we, ASHBELL BARNUM and JAMES A. WISHART, of Green Island, in the county of Albany and State of New York, have invented certain new and useful Improvements in Stove-Pipe Dampers; and we do hereby declare that the following is a full, clear, and exact description thereof, reference being had to the accompanying drawings, and to the letters of reference marked thereon, which form part of this specification.

The nature of our invention consists in the construction and arrangement of a self-regulating stove-pipe damper, as will be hereinafter more fully set forth.

Figure 1:
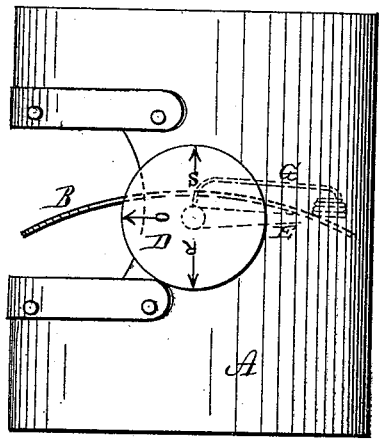
Figure 2:
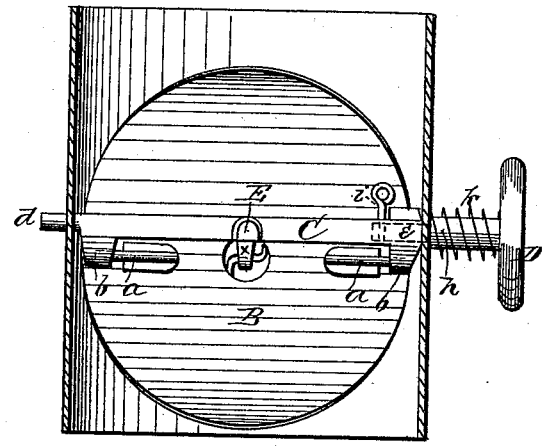
Figure 3:
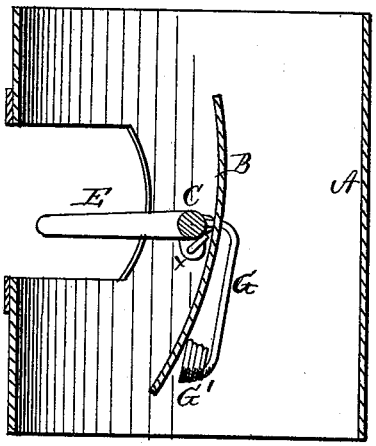
Figure 4:
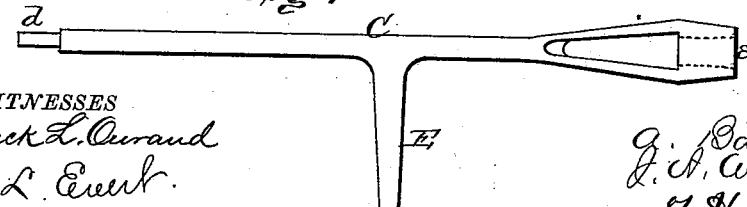

In the annexed drawing, Figure 1 is a side elevation of a stove-pipe with our damper therein. Figs. 2 and 3 are vertical sections of the same. Fig. 4 shows the shaft of the damper.

A represents the stove-pipe in which the damper B is placed. This damper is made of a circular sheet-metal plate, bent or curved on the arc of a circle, and provided on its concave side with two pins or pivots, $a\ a$, pointing outward on a diametrical line in the center of the concave, said pivots being, however, within the circumference of the damper. The damper is sprung so that these pins or pivots will enter holes in two projections, $b\ b$, formed upon one side of a shaft, C, which, at one end, forms a journal, $d$, to enter a hole in the stove-pipe, and has a square socket, $e$, formed in the other end. Into this socket, from the outside of the pipe, is passed the shank $h$ of a knob, D, the shank being fastened in the shaft by a pin, $i$. Surrounding the shank $h$, between the knob and the stove-pipe, is a spiral spring, $k$, to produce sufficient friction for holding the damper in any position in which it may be set. From the center of the shaft C projects an arm, E, and at right angles therewith on the shaft is an ear, $x$, in which is hinged a wire, G, passing through a center hole in the damper, and over the convex portion thereof. The outer end of the wire G is twisted to form a weight, G′, to rest on top of the damper. On the face of the knob D are three indexes, marked, respectively, R, O, and S. When the index S is turned upward the arm E extends out horizontally, and the weighted wire G holds the damper thereon, or, in other words, the damper is shut. By turning the index O upward both the arm E and wire G hang downward, with the damper between them, and the damper is thus held open. By turning the index R upward the arm E extends horizontally outward in the opposite direction, while the wire G hangs downward, with the damper sufficiently inclined that the draft will act upon its lower convex side and close the same more or less, according to the strength of the draft, thus forming a self-regulator.

Having thus fully described our invention, what we claim as new, and desire to secure by Letters Patent, is—

1. The circular bent damper B, provided with pivots $a$ on its concave side, and hung in projections $b$ on the shaft C, as and for the purposes herein set forth.

2. The shaft C, with arm E, and hinged weighted wire G, in combination with the damper, for the purposes set forth.

3. The shank $h$, spring $k$, and knob D, with indexes R O S, in combination with the shaft, arm, wire, and damper, for the purposes herein set forth.

In testimony that we claim the foregoing as our own we affix our signatures in presence of two witnesses.

ASHBELL BARNUM.
JAMES A. WISHART.

Witnesses:
ARCHIE CULLEN,
ANDREW WISHART.